United States Patent
Sychta et al.

(10) Patent No.: US 10,023,121 B1
(45) Date of Patent: Jul. 17, 2018

(54) REAR VISION CAMERA SWITCHING

(71) Applicant: GM GLOBAL TECHNOLOGY OPERATIONS LLC, Detroit, MI (US)

(72) Inventors: Brian V. Sychta, Lake Orion, MI (US); Reno V. Ramsey, Sterling Heights, MI (US); Mohannad Murad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/598,134

(22) Filed: May 17, 2017

(51) Int. Cl.
  *B60R 11/04* (2006.01)
  *B60R 1/02* (2006.01)
  *G08G 1/017* (2006.01)
  *B60R 1/12* (2006.01)

(52) U.S. Cl.
  CPC ............... *B60R 1/02* (2013.01); *B60R 11/04* (2013.01); *G08G 1/0175* (2013.01); *B60R 2001/1253* (2013.01); *B60R 2300/10* (2013.01); *B60R 2300/101* (2013.01); *B60R 2300/802* (2013.01)

(58) Field of Classification Search
  CPC ........ B60R 2300/302; B60R 2300/306; B60R 2300/307; B60R 2300/60; B60R 2300/602; B60R 2300/605; B60R 2300/607
  USPC ........................................................ 340/937
  See application file for complete search history.

(56) References Cited

U.S. PATENT DOCUMENTS

2014/0125802 A1* 5/2014 Beckert ................. H04N 7/181
                                                                 348/148

* cited by examiner

*Primary Examiner* — Kevin Kim
(74) *Attorney, Agent, or Firm* — Lorenz & Kopf, LLP

(57) ABSTRACT

Methods and systems are provided for controlling camera images of vehicle cameras. In one example, a camera, a radio system, a processor, and a display are disposed onboard a vehicle. The camera is configured to generate camera images. The radio system is configured to process the camera images. The processor is configured to at least facilitate determining whether a radio system of the vehicle is functioning properly; processing the camera images through the radio system prior to displaying the camera images within the vehicle, if the radio system is functioning properly; and providing instructions for displaying the camera images within the vehicle without processing the camera images through the radio system, if the radio system is not functioning properly. The display is configured to display the camera images in accordance with the instructions provided by the processor.

17 Claims, 4 Drawing Sheets

REAR VISION CAMERA SWITCHING

TECHNICAL FIELD

The technical field generally relates to the field of vehicles and, more specifically, to methods and systems for controlling a rear vision camera in a vehicle.

BACKGROUND

Many vehicles include a rear vision camera that provides a view for a region behind the vehicle. However, in certain circumstances the rear view camera may be part of a system that does not always provide optimal images in certain situations.

Accordingly, it is desirable to provide improved methods and systems for controlling rear vision cameras in vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes determining whether a radio system of the vehicle is functioning properly; processing the camera images through the radio system prior to displaying the camera images within the vehicle, if the radio system is functioning properly; and displaying the camera images within the vehicle without processing the camera images through the radio system, if the radio system is not functioning properly.

In accordance with another exemplary embodiment, a system is provided. The system includes a camera and a processor. The camera is disposed onboard a vehicle, and is configured to generate camera images. A processor is coupled to the camera, and is configured to at least facilitate determining whether a radio system of the vehicle is functioning properly; processing the camera images through the radio system prior to displaying the camera images within the vehicle, if the radio system is functioning properly; and displaying the camera images within the vehicle without processing the camera images through the radio system, if the radio system is not functioning properly.

In accordance with a further exemplary embodiment, a vehicle is provided. The vehicle includes a camera, a radio system, a processor, and a display. The camera is disposed onboard the vehicle, and is configured to generate camera images. The radio system is disposed onboard the vehicle, and is configured to process the camera images. The processor is disposed onboard the vehicle, and is coupled to the camera and the radio system. The processor is configured to at least facilitate determining whether a radio system of the vehicle is functioning properly; processing the camera images through the radio system prior to displaying the camera images within the vehicle, if the radio system is functioning properly; and providing instructions for displaying the camera images within the vehicle without processing the camera images through the radio system, if the radio system is not functioning properly. The display is coupled to the processor, and is disposed onboard the vehicle. The display is configured to display the camera images in accordance with the instructions provided by the processor.

DESCRIPTION OF THE DRAWINGS

The present disclosure will hereinafter be described in conjunction with the following drawing figures, wherein like numerals denote like elements, and wherein:

FIG. 3 is a flowchart of a process for controlling a rear vision camera of a vehicle, and that can be implemented in connection with the vehicle, camera, radio system, control system, display, and system of FIGS. 1 and 2, in accordance with an exemplary embodiment. Applicant notes that FIG. 3 includes two pages to the same flowchart, and has labelled these two pages as FIG. 3A and FIG. 3B, with FIG. 3B being a continuation of FIG. 3A. For ease of reference, and because FIGS. 3A and 3B are also collectively referred to as FIG. 3 in this Application.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
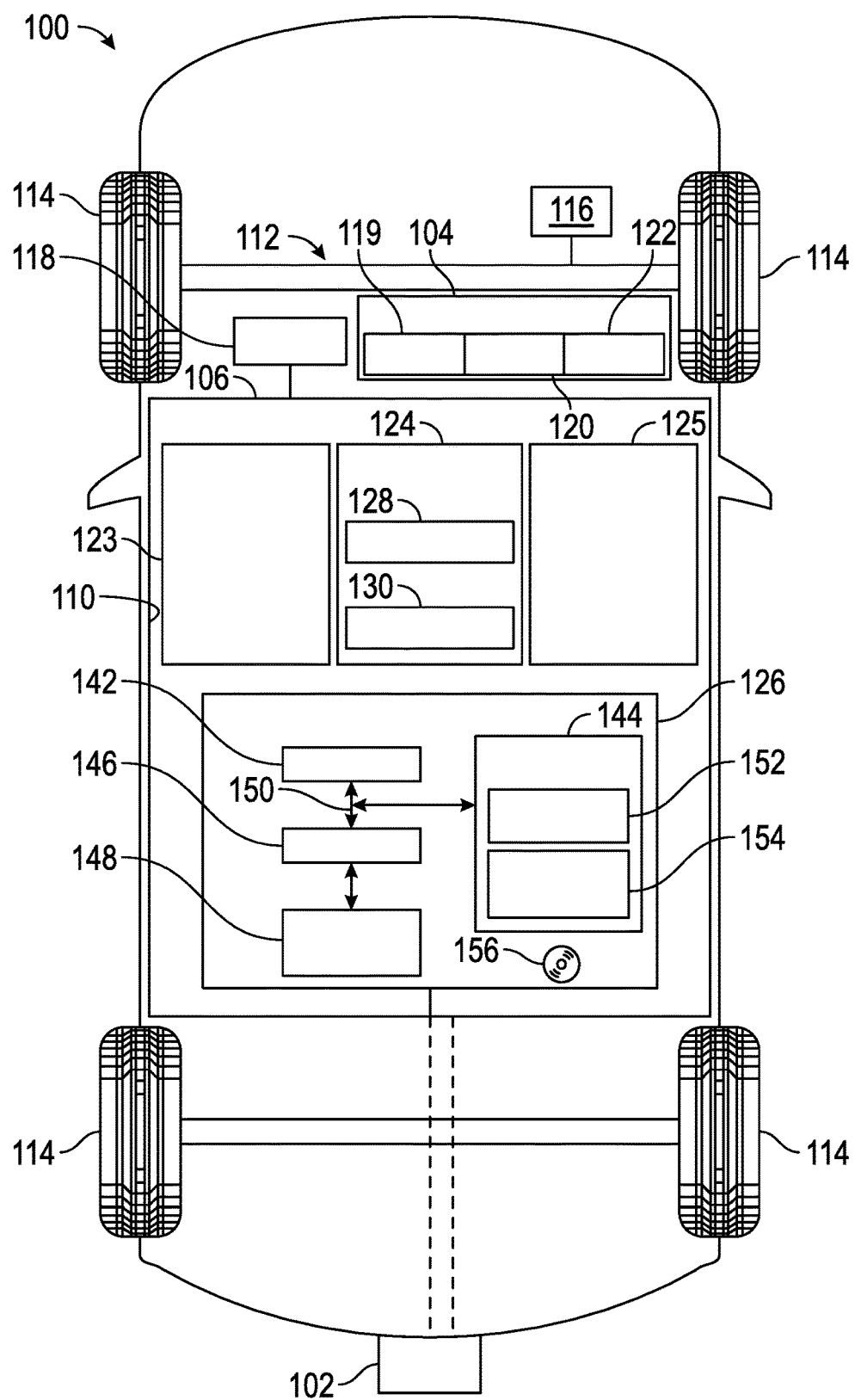
FIG. 1 is a functional block diagram of a vehicle that includes a camera, a radio system, a control system for controlling the camera, and one or more displays for displaying images from the camera, in accordance with an exemplary embodiment.

FIG. 1 illustrates a vehicle 100, according to an exemplary embodiment. As described in greater detail further below, the vehicle 100 includes a camera 102, a radio system 104, a control system 106, and a display 118.

As depicted in FIG. 1, the camera 102 comprises a rear vision camera that is mounted on a rear portion of the vehicle 100, and that provides images from behind the vehicle 100, for example when the vehicle 100 is in reverse. The camera 102 is controlled via a control system 106, as depicted in FIG. 1. In various embodiments, the control system 106 controls switching of the camera 102 in appropriate circumstances, for example depending on whether the radio system 104 is functioning properly, for example as discussed further below in connection with FIG. 1 as well as FIGS. 2 and 3.

The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system having a camera image with a fixed referenced point.

The vehicle 100 includes the above-referenced body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the camera 102 is mounted on the body 110 of the vehicle 100. In the depicted embodiment, the camera 102 is mounted on a rear end of the vehicle, as shown in FIG. 1. Also in the depicted embodiment, the camera 102 captures images from behind the vehicle 100, for example when the vehicle 100 is in reverse.

The camera 102 provides images from behind the vehicle 100 for viewing on one or more displays 108 that are disposed inside the vehicle 100 (i.e. inside the body 110 of the vehicle 100), and/or for providing other information for the vehicle 100 (e.g. information to a vehicle control system for use in vehicle control).

In one embodiment, the camera 102 provides images for viewing on a display 118 of a center console of the vehicle 100. In various embodiments, the display 118 may be part of a radio display, a navigation display, and/or other display, for example as part of or in proximity to the center console. In certain other embodiments, the display 118 may be part of one or more other vehicle 100 components, such as a rear view mirror. In one exemplary embodiment the display 118 comprises a liquid crystal display (LCD) screen or a light emitting diode (LED) screen. However, this may vary in other embodiments.

The radio system 104 is also disposed onboard the vehicle 100. The radio system 104 processes camera images from the camera 102. In addition, in various embodiments, the radio system 104 also provides for radio audio and/or other information and/or entertainment (e.g., FM radio, AM radio, satellite radio, compact disk, DVD, connectivity with electronic devices via wired connections and/or wireless communications, and so on).

As depicted in FIG. 1, the radio system 104 comprises a transceiver 119, a processor 120, and one or more tuners 122.

In various embodiments, the transceiver 119 transmits signals on a regular basis (preferably, on a continuous basis) to serve as an indication that the radio system 104 is functioning properly. In certain embodiments, the signals comprise "heartbeat" type signals for this purpose. In certain embodiments, the transceiver 119 also receives camera images from the camera 102 and/or instructions from the control system 106, and/or transmits filtered camera images to the control system 106 and/or the display 118.

Also in various embodiments, the processor 120 processes and buffers the camera images from the camera 102 prior to display on the display 118. In certain embodiments, the processor 120 provides overlays for the camera images, for example including guidelines for where or how to turn, and so on. In addition, in certain embodiments, when the camera 102 reduces its image rate from a first rate (e.g., 30 frames/second) to a second rate (e.g., 15 frames/second), the radio system 104 converts the images back to the first rate (e.g., 30 frames/second) as an output for showing on the display 118.

In various embodiments, the tuners 122 provide tuning for one or more radio frequencies (e.g., AM, FM, and/or satellite radio), and/or provide tuning and/or other assistance for radio audio and/or other information and/or entertainment (e.g., FM radio, AM radio, satellite radio, compact disk, DVD, connectivity with electronic devices via wired connections and/or wireless communications, and so on).

The control system 106 controls operation of the camera 102. In certain embodiments, the control system 106 also controls operation of the radio system 104 and/or the displays 108. The control system 106 is disposed within the body 110 of the vehicle 100. In one embodiment, the control system 106 is mounted on the chassis 112. Among other control features, the control system 106 obtains images from the camera 102, monitors whether the radio system 104 is functioning properly, and exercises control over the camera images (e.g., by determining the image rate for the camera 102 and also whether or not the camera images are to be sent to the radio system 104) based at least in part on whether the radio system 104 is functioning properly, in accordance with the steps of the process 300 discussed further below in connection with FIG. 3, in accordance with an exemplary embodiment.

In various embodiments, the control system 106 provides these and other functions in accordance with steps of the process 300 described further below in connection with FIG. 3. In certain embodiments, the control system 106 and/or one or more components thereof may be disposed outside the body 110, for example on a remote serve, in the cloud, or in a remote smart phone or other device where image processing is performed remotely. In addition, in certain embodiments, the control system 106 may be disposed within and/or as part of the camera 102, radio system 104, and/or display 118, and/or within and/or or as part of one or more other vehicle systems.

Also as depicted in FIG. 1, in various embodiments the control system 106 is coupled to the camera 102 via a communications link 109, and receives camera images from the camera 102 via the communications link 109. In certain embodiments, the communications link 109 comprises one or more wired connections, such as one or more cables (e.g. coaxial cables and/or one or more other types of cables). In other embodiments, the communications link 109 may comprise one or more wireless connections, e.g., using transceiver 123 depicted in FIG. 1.

As depicted in FIG. 1, the control system 106 includes the above-referenced transceiver 123, as well as a sensor array 124, a video switch 125, and a controller 126. Also as depicted in FIG. 1, in certain embodiments the control system 106 may also include and/or is part of one or more of the camera 102, the radio system 104, and/or the display 118, and/or one or more components thereof.

The transceiver 123 monitors transmission signals from the radio system 104 (e.g., from the transceiver 119 of the radio system 104), to monitor the health of the radio system 104. In certain embodiments, the transceiver 123 also received and/or transmits camera images (e.g., processed and/or unprocessed) from and/or to the camera 102, the radio system 104, and/or the display 118.

The sensor array 124 generates sensor data, and provides the sensor data to the controller 126 for processing. As depicted in FIG. 1, the sensor array 124 includes one or more gear sensors 128 and light sensors 130. In various embodiments, the gear sensors 128 detect a gear or transmission state of the vehicle 100 (e.g., park, drive, neutral, reverse, and so on, such as by detecting movement and/or activation of an ignition, and so on). Also in various embodiments, the light sensors 130 detect light conditions outside the vehicle 100, for use in determining whether nighttime conditions are present.

The video switch 125 causes the transmission of the camera images to be provided via one or more routes, based on instructions provided by the controller 126. In certain embodiments, the video switch causes the camera images to be provided either directly from the camera 102 to the display 118 (without being sent to the radio 104), or to be provided from the camera 102 to the radio system 104, depending upon the position of the video switch 125, as set by the controller 126.

The controller 126 controls operation of the camera images. In various embodiments, the controller 126 monitors whether the radio system 104 is functioning properly, and provides instructions for the camera images to be provided either directly from the camera 102 to the display 118 (without being sent to the radio 104), or to be provided from the camera 102 to the radio system 104, depending upon the whether the radio system 104 is functioning properly. In certain embodiments, the controller 126 provides this functionality via engagement of the video switch 125. In addition, in certain embodiments, the controller 126 also controls a frequency of the camera 102 based upon whether nighttime conditions are in effect, and based on whether the radio system 104 is functioning properly. Also in various embodiments, the controller 126 provides these and other functions in accordance with the steps discussed further below in connection with the schematic drawings of the vehicle 100 and components of FIGS. 1 and 2 and the flowchart of FIG. 3.

In one embodiment, the controller 126 is coupled to the camera 102, the radio system 104, and the display 118. Also in one embodiment, the controller 126 is disposed within the control system 106, within the vehicle 100. In certain embodiments, the controller 126 (and/or components thereof, such as the processor 142 and/or other components) may be part of and/or disposed within the camera 102, the radio system 104, the display 118, and/or one or more other vehicle components. Also in certain embodiments, the controller 126 may be disposed in one or more other locations of the vehicle 100. In addition, in certain embodiments, multiple controllers 126 may be utilized (e.g. one controller 126 within the vehicle 100 and another controller within the camera 102, the radio system 104, and/or the display 118), among other possible variations. In addition, in certain embodiments, the controller can be placed outside vehicle, such as in a remote server, in the cloud or on a remote smart device.

As depicted in FIG. 1, the controller 126 comprises a computer system. In certain embodiments, the controller 126 may also include the transceiver 123, one or more sensors of the sensor array 124, the video switch 125, and/or other devices and/or components thereof. In addition, it will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the process 300 described further below in connection with FIG. 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. In one embodiment, the interface 146 obtains the various data from the camera 102, the radio system 104, the transceiver 123, the sensor array 124, and/or the video switch 125. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 300 (and any sub-processes thereof) described further below in connection with FIG. 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

Figure 2:
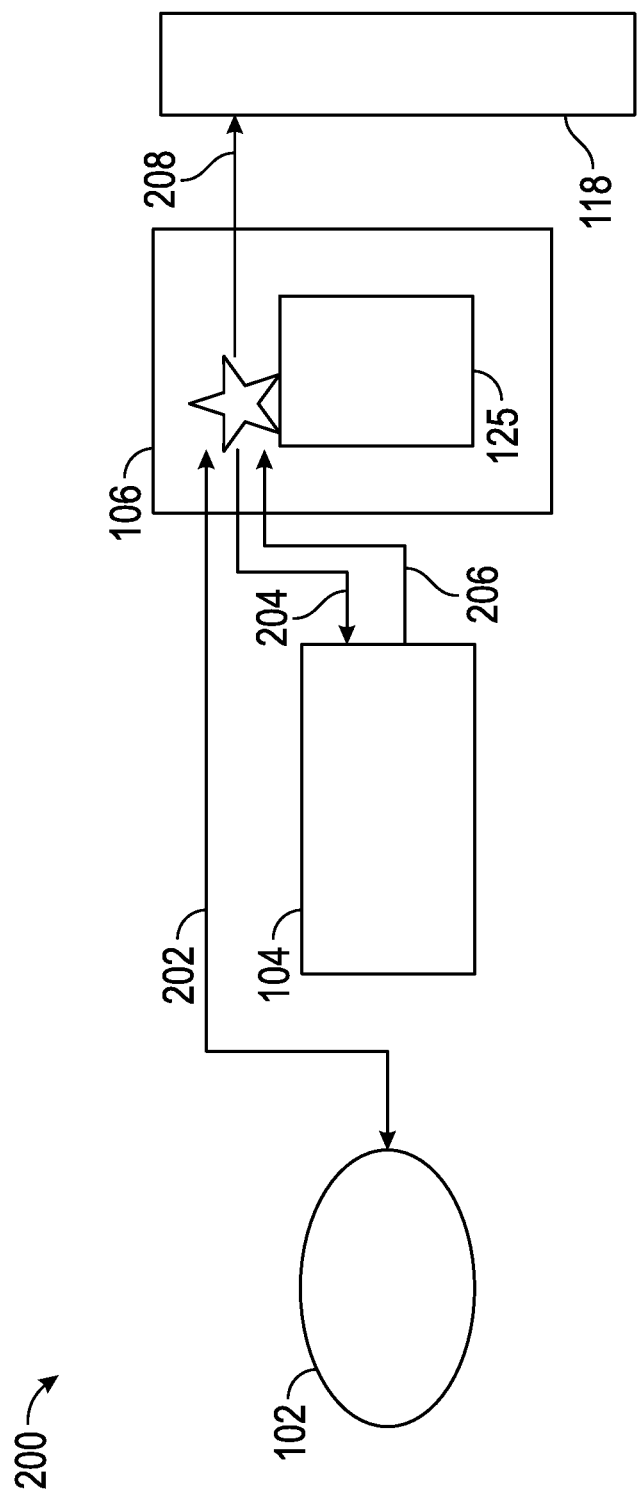
FIG. 2 is a functional block diagram for a system of the vehicle of FIG. 1, including the camera, the radio system, the control system, and the display, in accordance with an exemplary embodiment.

FIG. 2 is a functional block diagram for a system 200 of the vehicle 100 of FIG. 1, in accordance with an exemplary embodiment. As depicted in FIG. 1, the system 200 includes the camera 102, the radio system 104, the control system 106 (including the video switch 125 thereof), and the display 118 of FIG. 1.

As depicted in FIG. 2, in one embodiment, the camera 102 provides camera images to the control system 106 along first path 202. Also in one embodiment, the control system 106 provides the camera images to the radio system 104 along second path 204 for processing. Also in one embodiment, the radio system 104 processes the camera images, and provides the processed images to the control system 106 along third path 206 for analysis. In addition, also in one embodiment, the radio system 104 also transmits signals to the control system 106 along the third path 206 to indicate that the radio system 104 is functioning properly (e.g., by sending continuous, "heartbeat" type signals).

Also in one embodiment, the control system 106 determines whether the radio is functioning properly based on whether the heartbeat type signals have been received from the radio system 104, and/or by an analysis of the processed images from the radio system 104. In addition, in one embodiment, the control system 106 utilizes the video switch 125 to bypass processing by the radio system 104 when the radio system 104 is not functioning properly. Specifically, when the radio system is functioning properly, subsequent camera images continue to be processed by the radio system 104, and the processed images are then provided along fourth path 208 for display on the display 118. Conversely, when the radio system is not functioning properly, subsequent camera images are not processed by the radio system 104, and are instead bypassed by the radio system 104 via the video switch 125 to be provided directly to the display 118 via the fourth path 208 for display via the display 118.

In addition, in various embodiments, the control system 106 also provides instructions to the camera 102 along the first path 202 to control the image rate for the camera 102 based on whether nighttime conditions are present and based on whether the radio system 104 is functioning properly. Specifically, in one embodiment, when nighttime conditions are not present (e.g., when a light intensity surrounding the vehicle 100 is greater than a predetermined threshold), the camera 102 is instructed to capture and provide images at a first (relatively higher) rate (e.g., thirty frames per second, in one embodiment). Also in one embodiment, when nighttime conditions are present (e.g., when a light intensity surrounding the vehicle 100 is less than a predetermined threshold), the camera 102 is instructed to capture and provide images at a second (relatively lower) rate (e.g., fifteen frames per second, in one embodiment) if the radio system 104 is functioning properly, and at the first (relatively higher) rate (e.g., thirty frames per second, in one embodiment) if the radio system 104 is not functioning properly. In some embodiments, there may be no additional light sensor processing, and instead the camera 102 acts as a light sensor (e.g., the camera 102 decides if it is nighttime or daytime). In one such configuration the camera is 102 instructed by the control system 106 (via the first path 202) to stay at the higher frame rate and not to switch to lower frames if the radio is not working properly Also in various embodiments, the system 200 of FIG. 2, and the vehicle 100 of FIG. 1 and components thereof, provide these and other functions in accordance with the process 300, depicted in FIG. 3 and described below in connection therewith.

Figure 3A:
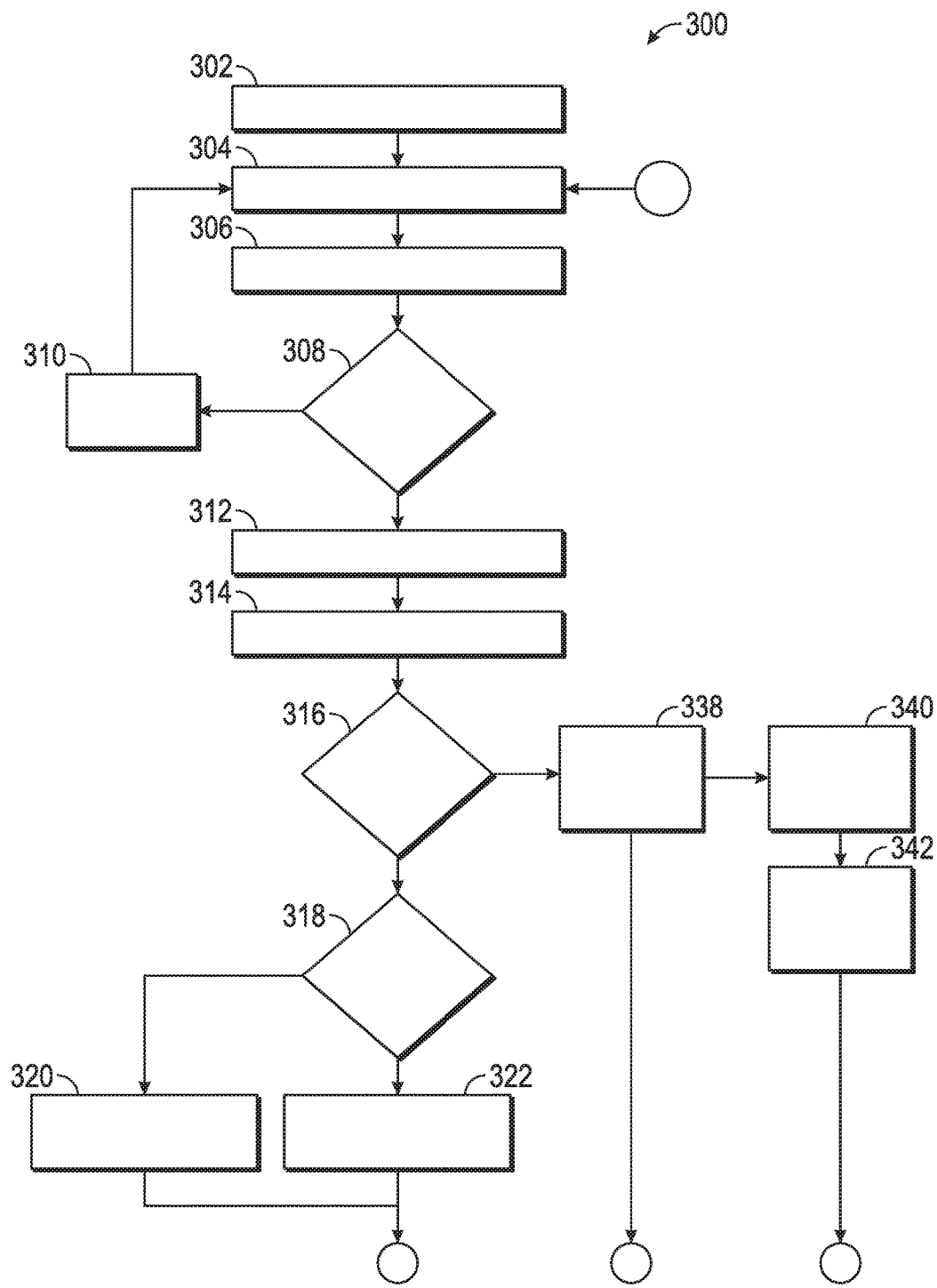
FIG. 3A and FIG. 3B represent a single flowchart.
Figure 3B:
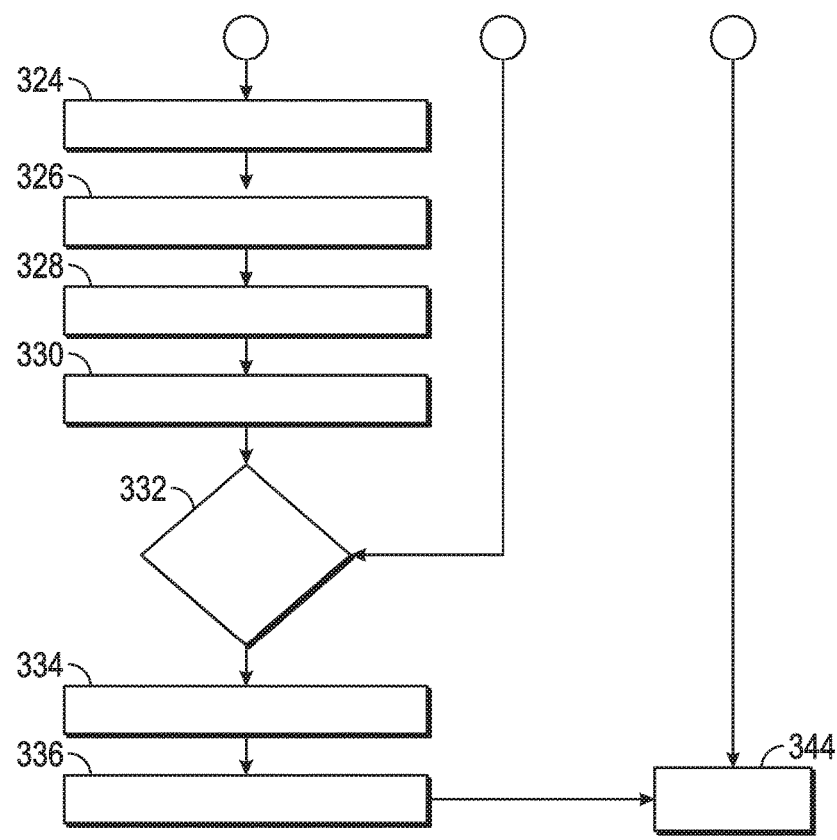

FIG. 3 is a flowchart of a process 300 for controlling a camera of a vehicle, in accordance with an exemplary embodiment. The process 300 of FIG. 3 can be implemented in connection with the vehicle 100, camera 102, control system 106, and displays 108 of FIG. 1, and the system 200 of FIG. 2 (and the associated flows depicted in FIG. 2) in accordance with an exemplary embodiment.

As depicted in FIG. 3, the process begins at 302. In one embodiment, the process 300 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In another embodiment, the process 300 begins when the camera 102 is activated (e.g., when the vehicle 100 is in a reverse gear triggering use of a rear camera, and so on). In one embodiment, the steps of the process 300 are performed continuously during operation of the vehicle.

Sensor data is obtained at step 304. In certain embodiments, sensor data is obtained from the gear sensor 128 of FIG. 1 with respect to a current gear or transmission (e.g., park, reverse, neutral, drive, and so on) of the vehicle 100. Also in certain embodiments, sensor data is obtained from the light sensor 130 of FIG. 1 with respect to a light intensity surrounding the vehicle 100.

Radio signals are transmitted at step 306. In certain embodiments, the radio system 104 of FIG. 1 transmits signals (e.g., "heartbeat" type signals) on a continuous basis to serve as an indication that the radio system 104 is functioning properly. Also in certain embodiments, the radio signals are transmitted by the transceiver 119 of the radio system 104 of FIG. 1 and are received by the controller 126 of FIG. 1 (and/or indirectly via the transceiver 123 of the control system 106 of FIG. 1).

A determination is made as to whether the vehicle 100 is in a reverse gear at step 308. In certain embodiments, the processor 142 of FIG. 1 determines that the vehicle is in a reverse gear based on sensor data provided by one or more gear sensors 128 of FIG. 1 at step 304 above (e.g., as to whether a driver has shifted the gear to reverse).

In one embodiment, if the vehicle is not in a reverse gear, then the process proceeds to step 310, in which the radio system 104 provides information and/or entertainment via a radio and/or other component of the radio system 104, instead of showing the rear camera images on the display 118. The process then returns to step 304, and steps 304-310 thereafter repeat until a determination has been made in an iteration of step 308 that the vehicle 100 is now in a reverse gear.

Once a determination is made that the vehicle 100 is in a reverse gear, camera images are generated at step 312. In one embodiment, the camera 102 of FIG. 1 generates camera images from behind the vehicle 100.

The camera images are provided to the 126 at step 314. In one embodiment, the camera images are provided from the camera 102 of FIG. 1 to the control system 106 of FIG. 1 via the communications link 109 of FIG. 1. In certain other embodiments, the camera images may instead be provided in another manner, such as via one or more transceivers.

A determination is made at step 316 as to whether the radio signals have been received. In one embodiment, the processor 142 of FIG. 1 determines whether the transceiver 123 of the control system 106 has received the "heartbeat" signals of step 306 from the radio system 104.

If it is determined at step 316 that the radio signals (e.g., the "heartbeat" signals of step 306) have been received (e.g., receiving the "heartbeat" signals in one embodiment means that the radio is working properly and therefore it will be appropriate to reduce the frame rate as a mechanism to enhance night time image quality, when nighttime conditions are present), then a determination is made at step 318 as to whether nighttime conditions are present. In one embodiment, this determination is made by the processor 142 as to whether the light intensity measured by the light sensors 130 and/or camera 102 (which can also act as a light sensor) at step 304 is less than a predetermined light intensity threshold. In one embodiment, the predetermined light intensity threshold is equal to ten lux; however, this may vary in other embodiments.

If it is determined that nighttime conditions are present, then the frequency for the camera 102 is set to the second (relatively lower frequency) at step 320. In one embodiment, the frequency is lowered in order to enhance night time image quality. Also in one embodiment, the processor 142 provides instructions for the camera 102 to capture and provide images from behind the vehicle 100 at the second frequency. In one embodiment, the second frequency is equal to fifteen frames per second. However, this may vary in other embodiments. Also in various embodiments, the lower frequency allows more light to enter the camera imaging sensor and therefore improve image quality, and the radio system can be subsequently used to restore the higher frequency during processing. The process then proceeds to step 324, described further below.

If it is instead determined that nighttime conditions are not present, then the frequency for the camera 102 is set to the first (relatively higher frequency) at step 322. In one embodiment, the processor 142 provides instructions for the camera 102 to capture and provide images from behind the vehicle 100 at the first frequency. In one embodiment, the first frequency is equal to thirty frames per second. However, this may vary in other embodiments. The process then proceeds to step 324, described directly below.

During step 324, the camera images are provided to the radio system 104 (regardless of the frame rate applied in step 320 or 322). In one embodiment, the camera images are provided from the camera 102 to the radio system 104 via the communications link 109 of FIG. 1. In other embodiments, the camera images may be provided via one or more other manners, such as via one or more transceivers.

The radio system 104 processes and buffers the camera images at step 326. In certain embodiments, the processor 120 of the radio system 104 processes the camera images and provides overlays for the camera images, for example including guidelines for where or how to turn, and so on. In certain embodiments, the radio system 104 also performs other types of image processing, such as cropping and distortion correction. In addition, in certain embodiments, when the camera 102 reduces its image rate from a first rate (e.g., 30 frames/second) to a second rate (e.g., 15 frames/second) during nighttime conditions, the radio system 104 converts the images back to the first rate (e.g., 30 frames/second) as an output for showing on the display 118.

During step 328, the processed camera images are provided from the radio system 104 to the control system 106. In one embodiment, the camera images are provided from the radio to the control system 106 via the communications link 109 of FIG. 1. In other embodiments, the camera images may be provided via one or more other manners, such as via one or more transceivers (e.g., via respective transceivers 119, 123 of FIG. 1).

The processed camera images are analyzed by the control system 106 at step 330. In various embodiments, the processor 142 of the control system 106 analyzes the image quality of the processed camera images to determine whether the radio system 104 is properly processing the camera images in a manner that the processed images are satisfactory for viewing by users of the vehicle 100 on the display 118. In various embodiments, the processor 142 of the control system 106 determines the image quality based on whether (and how long and/or how often) the images become frozen, or stuck; and also based on whether the images are predominantly of a single color (e.g., blue or black).

A determination is made at step 332 as to whether the image quality is acceptable. In one embodiment, the processor 142 of the control system 106 determines that the image quality of the processed images is not acceptable if the images become frozen, or stuck, for more than a predetermined amount of time. In one embodiment, the predetermined amount of time is equal to one second; however, this may vary in other embodiments. Also in one embodiment, the processor 142 determines that the image quality of the processed images is not acceptable if the images are predominantly a single color (e.g., if greater than a predetermined percentage of the pixels of the processed images are black, blue, or another single color). In various embodiments, the image quality is deemed to be not acceptable if either or both of these conditions (i.e., frozen images, and/or images of predominantly the same color) are met.

If it is determined that the image quality is acceptable, then the process proceeds to step 334. During step 334, the images continue to be processed and provided in the standard mode of operation, using the radio system 104 for processing. The processed images are then provided to the display 118 (via instructions provided by the processor 142) for display within the vehicle 100. In one embodiment, the process then returns to the above-described step 304.

Conversely, if it is determined that the image quality is not acceptable, then the radio system 104 is deemed to not be functioning properly, and the process proceeds instead to step 338, described further below.

With reference back to step 316, if it is determined at step 316 that the radio signals (e.g., the "heartbeat" signals of step 306) have not been received, then the process also proceeds to step 338, described directly below.

During step 338, a camera frequency is set to a first (or relatively higher) frequency at step 338. In one embodiment, the processor 142 of FIG. 1 provides instructions for the camera 102 of FIG. 1 to capture and provide images at the first (or relatively higher frequency) discussed above. Per the discussion above, in one embodiment the first frequency is equal to thirty frames per second. However, this may vary in other embodiments. Also in various embodiments, the relatively higher frequency is maintained because the radio system 104 is not functioning properly, and therefore would be unable to restore the higher frequency during processing if the lower frequency were used instead by the camera 102 under these conditions.

In addition, a bypass mode is established for the camera 102 at step 340. Specifically, in one embodiment, the processor 142 provides instructions for the video switch 125 of FIG. 1 to allow subsequent camera images to be provided directly to the display 118 of FIG. 1 for display within the vehicle 100, rather than being first provided to the radio system 104 for processing. The camera images are provided via the display 118 within the vehicle 100 at step 342, in accordance with instructions provided by the processor 142, in one embodiment. In one embodiment, the process then returns to the above-described step 304.

In accordance with certain embodiments, and by way of additional explanation, in many examples the display 118 of the vehicle 100 of FIG. 1 may be configured and/or designed to accept only images at the relatively higher frequency (i.e., the first frequency discussed above), and may not be configured to accept images at the relatively lower frequency (i.e., the second frequency, discussed above). Accordingly, in such an example, during the bypass mode of steps 338-342, the display 118 would not be able to display the images if the images were received directly from the camera 102 at the relatively lower frequency (i.e., the second frequency). Accordingly, in situations in which the radio system 104 is not functioning properly (e.g., when a determination is made in step 316 that the "heartbeat" signal from the radio is not received) and the system is thus in the "bypass" mode of steps 338-342, the camera 102 is instructed to provide the images at the relatively higher frequency (i.e., the first frequency), even at night time (i.e., rather than switching to the relatively frequency at night time, as would normally be the case for improved image quality at night time).

Accordingly, the systems, vehicles, and methods described herein provide for controlling camera images of a rear view camera for a vehicle. In accordance with various embodiments, when the radio system is functioning properly, then the camera images are processed by a radio system of the vehicle, and a frequency of the camera is adjusted based on whether nighttime conditions are present. Conversely, also in accordance with various embodiments, when the radio system is not functioning properly, then a video switch is used to bypass the radio system, so that the camera images are provided directly to the display for displaying the images within the vehicle, without being sent to the radio system. In addition, when the radio system is not functioning properly, the frequency of the camera is not adjusted based on nighttime conditions.

The systems, vehicles, and methods thus provide for potentially improved rear camera images for viewing by users of the vehicle. For example, when the radio system is not functioning properly, adjustments are made to bypass the radio system and to maintain the relatively higher camera frequency, including at nighttime, to provide potentially improved images for display. In addition, when the radio system is functioning properly, the radio system is utilized to process the images, and the relatively lower camera frequency is used at nighttime for improved processing (e.g., to allow more light to enter the camera imaging sensor), to thereby provide potentially improved images.

It will be appreciated that the systems, vehicles, and methods may vary from those depicted in the Figures and described herein. For example, the vehicle 100, the camera 102, the radio system, the control system 106, the display 118, the system 200, and/or various components thereof may vary from that depicted in FIGS. 1 and 2 and described in connection therewith, in various embodiments. It will similarly be appreciated that the steps of the process 300 may differ from those depicted in FIG. 3, and/or that various steps of the process 300 may occur concurrently and/or in a different order than that depicted in FIG. 3, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling camera images for a camera of a vehicle, the method comprising:
   determining whether a radio system of the vehicle is functioning properly;
   processing the camera images through the radio system prior to displaying the camera images within the vehicle, if the radio system is functioning properly;
   displaying the camera images within the vehicle without processing the camera images through the radio system, if the radio system is not functioning properly;
   setting a frequency for the camera to generate the camera images to a first predetermined frequency, if the radio system is functioning properly; and
   setting a frequency for the camera to generate the camera images to a second predetermined frequency that is different from the first predetermined frequency, if the radio system is not functioning properly.

2. The method of claim 1, wherein the camera comprises a rear view camera for the vehicle, and the method comprises:
   determining whether the vehicle is in a reverse gear; and
   generating the camera images via the rear view camera, provided that the vehicle is in the reverse gear;
   wherein the steps of processing the camera images through the radio system prior to displaying the camera images within the vehicle, if the radio system is functioning properly, and displaying the camera images within the vehicle without processing the camera images through the radio system, if the radio system is not functioning properly, are performed provided the vehicle is in the reverse gear.

3. The method of claim 1, wherein:
   the first predetermined frequency is approximately equal to fifteen frames per second; and
   the second predetermined frequency is approximately equal to thirty frames per second.

4. The method of claim 1, further comprising:
   transmitting signals from the radio system when the radio system is functioning properly;

wherein the step of determining whether the radio system of the vehicle is functioning properly comprises determining whether the signals are received from the radio system;

the step of processing the camera images through the radio system prior to displaying the camera images within the vehicle comprises processing the camera images through the radio system prior to displaying the camera images within the vehicle, if the signals are not received from the radio system; and the step of displaying the camera images within the vehicle without processing the camera images through the radio system comprises displaying the camera images within the vehicle without processing the camera images through the radio system, if the signals are not received from the radio system.

5. The method of claim 1, further comprising:

analyzing the camera images after processing by the radio system, wherein:

the step of determining whether the radio system of the vehicle is functioning properly comprises determining whether an image quality of the camera images meets a predetermined standard;

the step of processing the camera images through the radio system prior to displaying the camera images within the vehicle comprises processing subsequent camera images through the radio system prior to displaying the camera images within the vehicle, if the image quality meets the predetermined standard; and the step of displaying the camera images within the vehicle without processing the camera images through the radio system comprises displaying subsequent camera images within the vehicle without processing the camera images through the radio system, if the image quality does not meet the predetermined standard.

6. The method of claim 5, wherein:

the step of analyzing the camera images comprises determining whether the camera images are frozen after processing by the radio system;

the step of determining whether the radio system of the vehicle is functioning properly comprises determining whether the image is frozen after processing by the radio system;

the step of processing the camera images through the radio system prior to displaying the camera images within the vehicle comprises processing subsequent camera images through the radio system prior to displaying the camera images within the vehicle, if the camera images are not frozen after processing by the radio system; and the step of displaying the camera images within the vehicle without processing the camera images through the radio system comprises displaying subsequent camera images within the vehicle without processing the camera images through the radio system, if the camera images are frozen after processing by the radio system.

7. The method of claim 5, wherein:

the step of analyzing the images comprises determining whether the camera images are predominantly of a single color after processing by the radio system;

the step of determining whether the radio system of the vehicle is functioning properly comprises determining whether the image is predominantly of a single color after processing by the radio system;

the step of processing the camera images through the radio system prior to displaying the camera images within the vehicle comprises processing subsequent camera images through the radio system prior to displaying the camera images within the vehicle, if the camera images are not predominantly of a single color after processing by the radio system; and the step of displaying the camera images within the vehicle without processing the camera images through the radio system comprises displaying subsequent camera images within the vehicle without processing the camera images through the radio system, if the camera images are predominantly of a single color after processing by the radio system.

8. A system comprising:

a camera disposed onboard a vehicle and configured to generate camera images; and a processor coupled to the camera, the processor configured to at least facilitate:

determining whether a radio system of the vehicle is functioning properly;

processing the camera images through the radio system prior to displaying the camera images within the vehicle, if the radio system is functioning properly; and displaying the camera images within the vehicle without processing the camera images through the radio system, if the radio system is not functioning properly;

determining whether nighttime conditions are surrounding the vehicle;

setting a frequency for the camera to generate the camera images to a first predetermined frequency when nighttime conditions are not surrounding the vehicle, regardless of whether the radio system is functioning properly;

setting the frequency for the camera to generate the camera images to a second predetermined frequency, that is less than the first predetermined frequency, when nighttime conditions are surrounding the vehicle and the radio system is functioning properly; and setting the frequency for the camera to generate the camera images to the first predetermined frequency, when nighttime conditions are surrounding the vehicle and the radio system is not functioning properly.

9. The system of claim 8, wherein the radio system includes a transmitter for transmitting signals from the radio system when the radio system is functioning properly, and the processor is further configured to at least facilitate:

determining whether the signals are received from the radio system;

processing the camera images through the radio system prior to displaying the camera images within the vehicle, if the signals are received from the radio system; and displaying the camera images within the vehicle without processing the camera images through the radio system, if the signals are not received from the radio system.

10. The system of claim 8, wherein the processor is further configured to at least facilitate:

analyzing the camera images after processing by the radio system, wherein:

determining whether an image quality of the camera images meets a predetermined standard;

processing subsequent camera images through the radio system prior to displaying the camera images within the vehicle, if the image quality meets the predetermined standard; and displaying subsequent camera images within the vehicle without processing the camera images through the radio system, if the image quality does not meet the predetermined standard.

11. The system of claim 10, wherein the processor is further configured to at least facilitate:
determining whether the camera images are frozen after processing by the radio system;
determining whether the image is frozen after processing by the radio system;
processing subsequent camera images through the radio system prior to displaying the camera images within the vehicle, if the camera images are not frozen after processing by the radio system; and
displaying subsequent camera images within the vehicle without processing the camera images through the radio system, if the camera images are frozen after processing by the radio system.

12. The system of claim 10, wherein the processor is further configured to at least facilitate:
determining whether the camera images are predominantly of a single color after processing by the radio system;
determining whether the image is predominantly of a single color after processing by the radio system;
processing subsequent camera images through the radio system prior to displaying the camera images within the vehicle, if the camera images are not predominantly of a single color after processing by the radio system; and
displaying subsequent camera images within the vehicle without processing the camera images through the radio system, if the camera images are predominantly of a single color after processing by the radio system.

13. A vehicle comprising:
a camera disposed onboard the vehicle and configured to generate camera images;
a radio system disposed onboard the vehicle and configured to process the camera images, the radio system including a transmitter for transmitting signals from the radio system when the radio system is functioning properly; and
a processor disposed onboard the vehicle and coupled to the camera and the radio system, the processor configured to at least facilitate:
determining whether a radio system of the vehicle is functioning properly, by determining whether the signals are received from the radio system;
processing the camera images through the radio system prior to displaying the camera images within the vehicle, if the signals are received from the radio system; and
providing instructions for displaying the camera images within the vehicle without processing the camera images through the radio system, if the signals are not received from the radio system; and
a display coupled to the processor, the display disposed onboard the vehicle and configured to display the camera images in accordance with the instructions provided by the processor.

14. The vehicle of claim 13, wherein the processor is further configured to at least facilitate:
setting a frequency for the camera to generate the camera images to a first predetermined frequency, if the radio system is not functioning properly; and
setting a frequency for the camera to generate the camera images to a second predetermined frequency that is different from the first predetermined frequency, if the radio system is functioning properly.

15. The vehicle of claim 13, wherein the processor is further configured to at least facilitate:
analyzing the camera images after processing by the radio system, wherein:
determining whether an image quality of the camera images meets a predetermined standard;
processing subsequent camera images through the radio system prior to displaying the camera images within the vehicle, if the image quality meets the predetermined standard; and providing instructions for displaying subsequent camera images within the vehicle without processing the camera images through the radio system, if the image quality does not meet the predetermined standard.

16. A method for controlling camera images for a camera of a vehicle, the method comprising:
analyzing the camera images after processing by a radio system of the vehicle;
determining whether the radio system is functioning properly, wherein the step of determining whether the radio system is functioning comprises determining whether an image quality of the camera images after processing by the radio system meets a predetermined standard;
processing subsequent camera images through the radio system prior to displaying the camera images within the vehicle, if the image quality meets the predetermined standard; and
displaying subsequent camera images within the vehicle without processing the camera images through the radio system, if the image quality does not meet the predetermined standard.

17. The method of claim 16, wherein:
the step of analyzing the camera images comprises determining whether the camera images are frozen after processing by the radio system;
the step of determining whether the radio system of the vehicle is functioning properly comprises determining whether the image is frozen after processing by the radio system;
the step of processing the camera images through the radio system prior to displaying the camera images within the vehicle comprises processing subsequent camera images through the radio system prior to displaying the camera images within the vehicle, if the camera images are not frozen after processing by the radio system; and
the step of displaying the camera images within the vehicle without processing the camera images through the radio system comprises displaying subsequent camera images within the vehicle without processing the camera images through the radio system, if the camera images are frozen after processing by the radio system.

* * * * *